(12) United States Patent
Miyazaki et al.

(10) Patent No.: US 7,272,717 B2
(45) Date of Patent: Sep. 18, 2007

(54) SYSTEM OF AUTHENTICATION, APPARATUS, PROGRAM AND METHOD

(75) Inventors: Shingo Miyazaki, Fuchu (JP); Naoki Endo, Fuchu (JP); Takehisa Kato, Kunitachi (JP); Daigo Yoshii, Fuchu (JP); Koichi Noguchi, Yokohama (JP); Hideo Shimizu, Kawasaki (JP); Toru Kambayashi, Chigasaki (JP); Yasuhiko Suzuki, Koganei (JP); Akio Okazaki, Yokohama (JP); Kenichi Hiramatsu, Kawasaki (JP); Sunao Wada, Yokohama (JP); Koji Mikami, Kawasaki (JP); Akira Toshima, Yokosuka (JP); Masao Suga, Ome (JP); Akihiro Kasahara, Sambu-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 821 days.

(21) Appl. No.: 10/373,746

(22) Filed: Feb. 27, 2003

(65) Prior Publication Data

US 2004/0019788 A1    Jan. 29, 2004

(30) Foreign Application Priority Data

Feb. 28, 2002    (JP) ............................. 2002-054916

(51) Int. Cl.
*H04L 9/12* (2006.01)
(52) U.S. Cl. ...................................... 713/169; 713/156
(58) Field of Classification Search ................ 713/157, 713/177, 169, 156
See application file for complete search history.

(56) References Cited

U.S. PATENT DOCUMENTS 5,224,163 A * 6/1993 Gasser et al. ................. 380/30
6,490,367 B1 * 12/2002 Carlsson et al. ............. 382/137
7,068,789 B2 * 6/2006 Huitema et al. ............. 380/277
2003/0236975 A1 * 12/2003 Birk et al. .................. 713/156
2004/0039906 A1 * 2/2004 Oka et al. ................... 713/156
2005/0114666 A1 * 5/2005 Sudia ......................... 713/175

FOREIGN PATENT DOCUMENTS

JP          2002217901      * 2/2002

* cited by examiner

*Primary Examiner*—Matthew Smithers
(74) *Attorney, Agent, or Firm*—Oblon, Spivak, McClelland, Maier & Neustadt, P.C.

(57) ABSTRACT

Each embodiment of this invention implements step-by-step and empirical authentication of devices upon digital authentication among a plurality of devices. Each of a plurality of authentication devices of each embodiment can unidirectionally generate a hash value of a low experience rank from a hash value of a high experience rank, and receives a set of high experience rank and hash value in accordance with an experience. Upon receiving a certification request of the experience rank from another authentication device, the authentication device transmits a corresponding hash value to the authentication device as a request source. Upon sending a certification request of an experience rank to another authentication device, the authentication device verifies a hash value obtained from the other authentication device on the basis of a self hash value. In this way, the authentication devices authenticate each other's experience ranks.

25 Claims, 10 Drawing Sheets

| Experience rank | Experience information | Device ID |
|---|---|---|
| 0 (Highest) | S | $20_3$ |
| 1 | $z_1$ | |
| 2 | $z_2$ | $20_x$ |
| ⋮ | ⋮ | |
| i−1 | $z_{i-1}$ | |
| i | $z_i$ | $20_a$ |
| i+1 | $z_{i+1}$ | |
| ⋮ | ⋮ | |
| k−1 | $z_{k-1}$ | |
| k (Lowest) | $z_k$ | $20_1, \cdots 20_n$ |

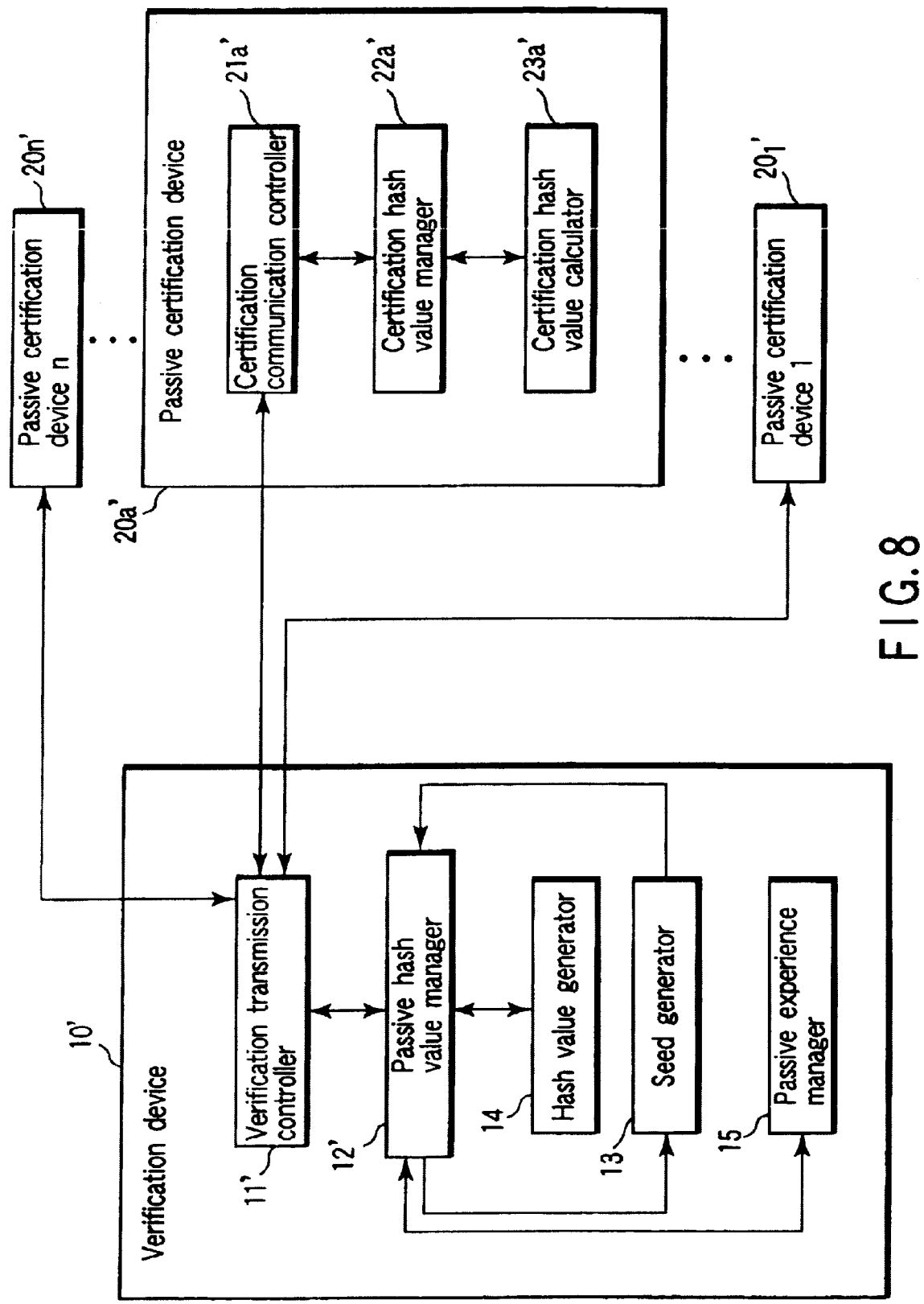
F I G. 8

SYSTEM OF AUTHENTICATION, APPARATUS, PROGRAM AND METHOD

CROSS-REFERENCE TO RELATED APPLICATIONS

This application is based upon and claims the benefit of priority from the prior Japanese Patent Application No. 2002-54916, filed on Feb. 28, 2002; the entire contents of which are incorporated herein by reference.

BACKGROUND OF THE INVENTION

The present invention relates to a system of authentication, device, program, and method, which can be applied to various authentication systems.

In general, upon authenticating each other's devices connected via a network, digital authentication using a public key cipher techniques based on public-key cryptosystems and challenge & response technique is prevalent.

In such digital authentication, a prover can show his or her own authenticity by an arithmetic process of numerical values given by a verifier, and the verifier can verify the authenticity of the prover by an arithmetic process and comparison process of the numerical values received from the prover.

Hence, such digital authentication is a technique suited to partner authentication used to identify a partner, as in electronic transactions and normal access control.

The conventional digital authentication is suitable for normal partner authentication used to identify a partner. However, according to considerations by the present inventors, the conventional digital authentication may be unsuitable for a case wherein other people's devices are operated as idle resources by collaboration, which is a recent trend in ubiquitous networking of information communication devices. Note that "ubiquitous" means existing or being everywhere.

The reason why the conventional digital authentication is unsuitable is that the conventional digital authentication makes an alternative decision of "authentic" or "unauthentic". For example, in a ubiquitous network, many unspecified user devices are connected to each other via, e.g., wireless communications. In this state, if the conventional digital authentication determines that a third party's device is determined to be "authentic", and connection is established to that device, the user may sustain inadvertent damage by an ill-disposed user.

On the other hand, if the conventional digital authentication determines that a third party's device is "unauthentic" and that device is excluded, the advantages of ubiquitous networking as favors of a distributed process using other people's devices cannot be enjoyed.

That is, according to considerations of the present inventors, in a new type of network such as a ubiquitous network or the like, a new type of digital authentication, i.e., step-by-step and empirical authentication, is required in addition to the conventional alternative digital authentication.

BRIEF SUMMARY OF THE INVENTION

It is an object of the present invention to provide an authentication system, device, program, and method, which can implement step-by-step and empirical authentication of respective devices upon digital authentication among a plurality of devices.

The first aspect of the present invention is directed to an authentication system in which first and second authentication devices authenticate each other.

Each of the first and second authentication devices comprises management means for managing experience information of a low experience rank, which is unidirectionally generated from experience information of a high experience rank, and for, when a set of its own experience rank and experience information higher than the managed set of experience rank and experience information are delivered in accordance with an experience, managing the delivered set of experience rank and experience information, certification means for, when a certification request of the its own experience rank is received from the other authentication device, transmitting corresponding experience information in the first management means to the authentication device as a request source, and verification means for, when a certification request of an experience rank is sent to the other authentication device, verifying experience information obtained from that authentication device on the basis of the self experience information in the management means.

Therefore, since each of the first and second authentication devices executes authentication on the basis of a set of experience rank and experience information, step-by-step and empirical authentication can be implemented upon digital authentication among a plurality of devices.

The second aspect of the present invention is directed to an authentication system which comprises a plurality of certification devices and a verification device.

The verification device comprises generation means for unidirectionally generating experience information of a low experience rank from experience information of a high experience rank, management means for managing sets of experience information and experience ranks generated by the generation means together with identification information of each certification device, delivery means for delivering a set of higher experience rank and experience information to each certification device with reference to the management means in accordance with an experience of that certification device, and verification means for, when a certification request of an experience rank is sent to a given certification device, verifying experience information obtained from that certification device with reference to the management means using the generation means.

Each certification device comprises management means for managing a set of experience rank and experience information of a verification device, and certification means for, when a certification request of an experience rank is received from the verification device, transmitting the experience information in the management means to the verification device.

Therefore, since the verification device delivers an experience rank and experience information to each certification device and makes it hold the delivered information, and controls each certification device to certificate the held contents, step-by-step and empirical authentication can be implemented upon digital authentication among a plurality of devices.

BRIEF DESCRIPTION OF THE SEVERAL VIEWS OF THE DRAWING

FIG. 8 is a functional block diagram showing the arrangement of the authentication system in the second embodiment in detail;

DETAILED DESCRIPTION OF THE INVENTION

Preferred embodiments of the present invention will be described hereinafter with reference to the accompanying drawings. Note that the first embodiment will explain an active authentication system in which a domain (each authentication device in an area) gradually and empirically authenticates one authentication device step by step. The second embodiment will explain a passive authentication system in which a domain is empirically and gradually authenticated step by step by one authentication device. The third embodiment will explain a case wherein the secrecy of experience information is improved as a common modification of the first and second embodiments.

FIRST EMBODIMENT

Figure 1:
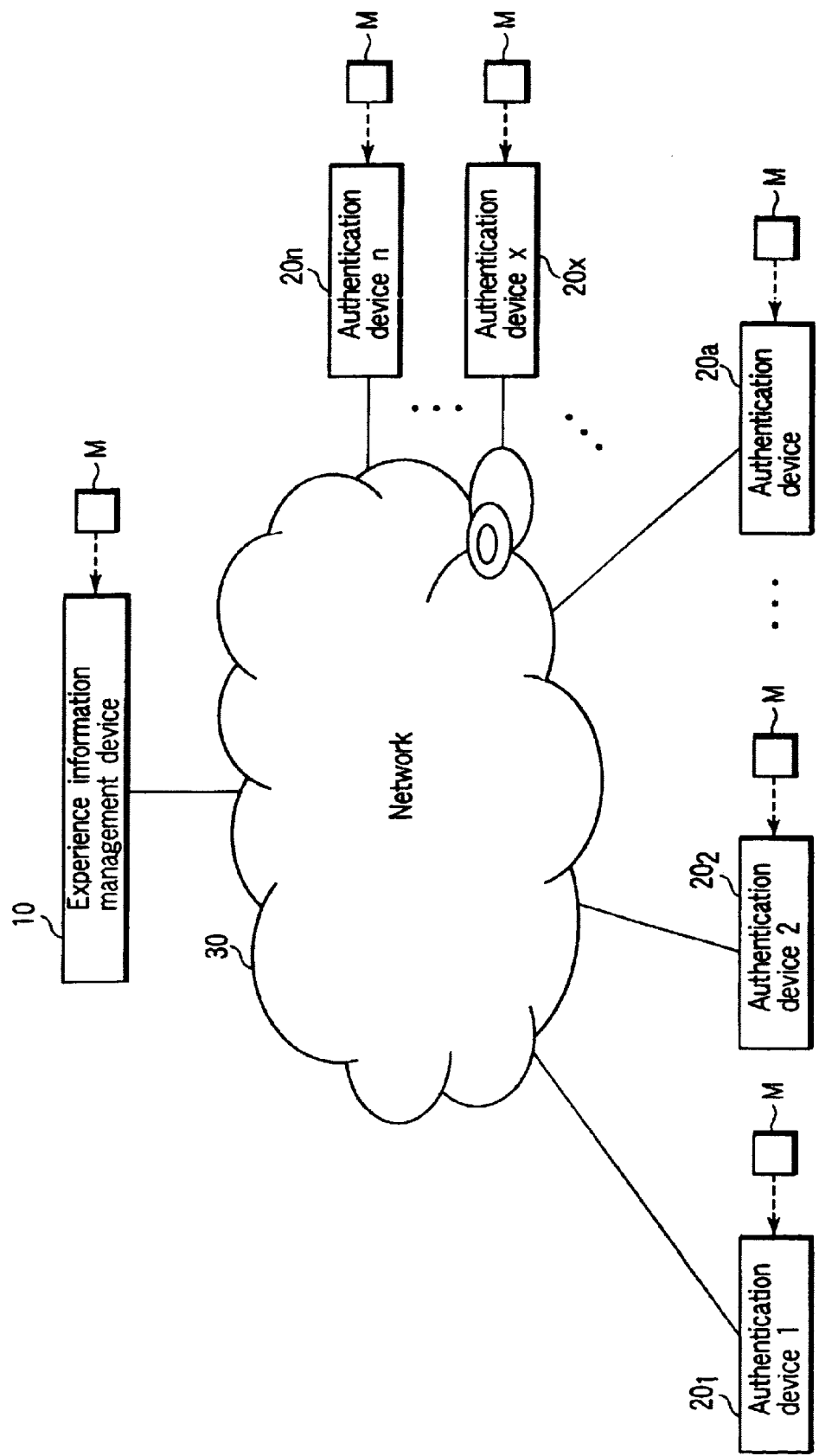
FIG. 1 is a schematic diagram showing the arrangement of an authentication system according to the first embodiment of the present invention.

FIG. 1 is a schematic diagram showing the arrangement of an authentication system according to the first embodiment of the present invention. In this authentication system, an experience information management device 10 is connected to n authentication devices $20_1, 20_2, \ldots, 20_a, \ldots, 20_x, \ldots, 20_n$ via a network 30. Note that the authentication devices $20_1$ to $20_n$ within a range in which they can communicate with each other via the network 30 form one area.

The network 30 comprises a wireless network, wired network, or an appropriate combination of them. Each of the devices $10, 20_1, \ldots, 20_n$ can be independently implemented by hardware and/or software. When each of the devices $10, 20_1, \ldots, 20_n$ is implemented by software, a program for implementing the functions of each of the devices $10, 20_1, \ldots, 20_n$ is installed from a storage medium M, network, or the like to implement the device. Such implementation of the network and devices applies to embodiments to be described later.

Figure 2:
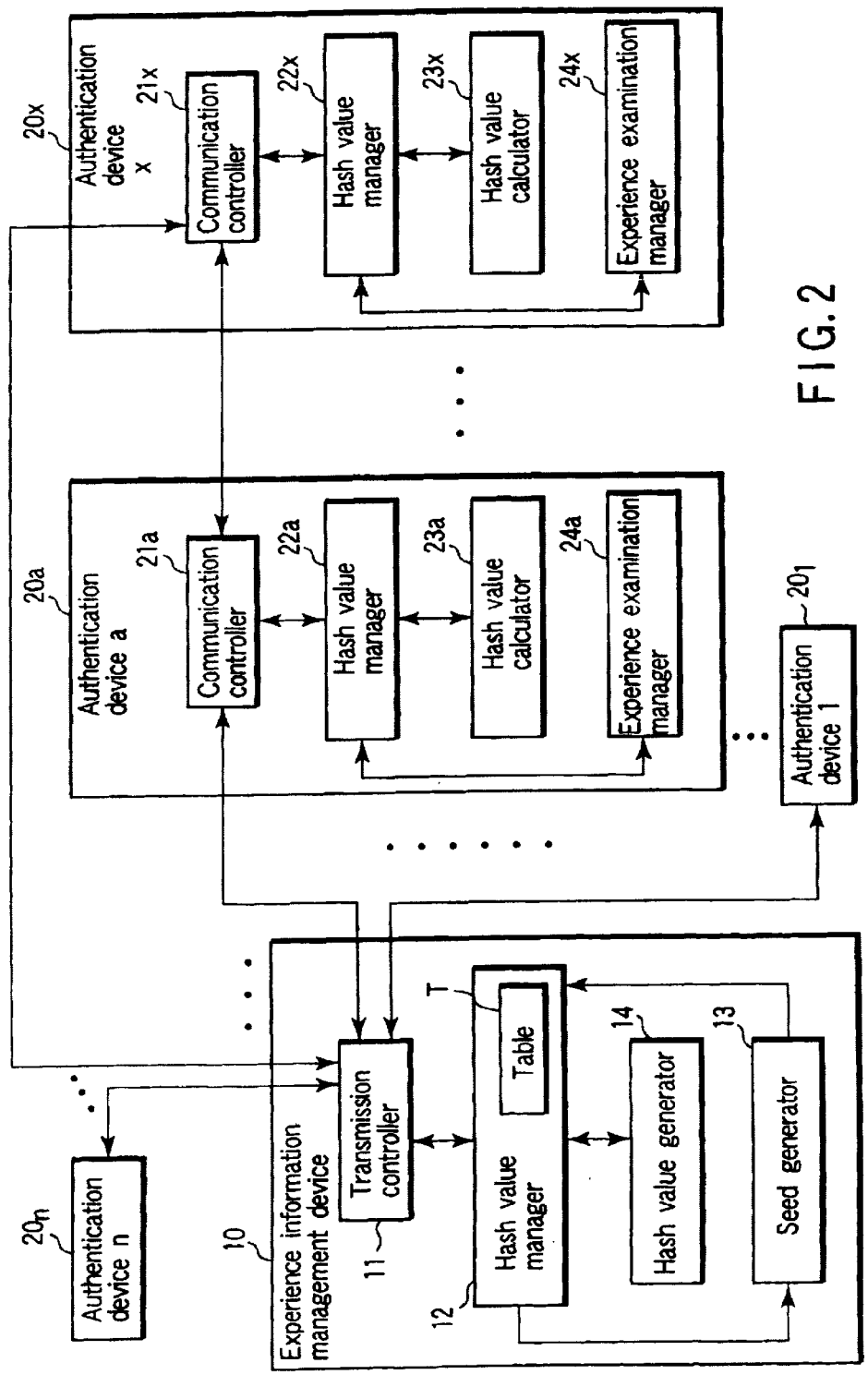
FIG. 2 is a functional block diagram showing the arrangement of the authentication system in the first embodiment in detail.

The experience information management device 10 manages and delivers experience ranks and hash values for each of the authentication devices $20_1, \ldots, 20_n$. More specifically, the experience information management device 10 comprises a transmission controller 11, hash value manager 12, seed generator 13, and hash value generator 14, as shown in FIG. 2.

The transmission controller 11 has the following functions (11/1) and (11/2).

(11/1) A function of transmitting an experience rank and hash value which are received from the hash value manager 12 at a predetermined timing to each of the authentication devices $20_1$ to $20_n$ which belong to the area of interest.

(11/2) A function of controlling the hash manager 12 on the basis of a hash value transmission request or re-transmission request received from an authentication device $20_j$ (j is an arbitrary natural number equal to or smaller than n), and transmitting an experience rank and hash value which are received from this hash value manager 12 to the authentication device $20_j$ as a request source.

The hash value manager 12 has the following functions (12/1) to (12/7).

(12/1) A function of transmitting a seed generation request which requests generation of seed information S to the seed generator 13.

(12/2) A function of managing seed information S received from the seed generator 13.

(12/3) A function of inputting a hash value calculation request that contains a recursive calculation count of hash values (all experience ranks k or difference information t), and source data (seed information S or hash values $z_i$ and $z_{i-t}$) to the hash value generator 14.

(12/4) A function of saving a hash value obtained from the hash value generator 14 in a management table T to form a set with an experience rank.

(12/5) A function of selecting, at a predetermined timing, hash value $z_{i-1}$ with an experience rank higher by 1 than hash value $z_i$ with experience rank i held in each device in turn from hash value $z_k$ with lowest experience rank k.

(12/6) A function of selecting a set of experience rank and hash value on the basis of a hash value transmission request.

(12/7) A function of outputting the selected appropriate set of the experience rank and hash value to the transmission controller 11.

Figures 3, 5:
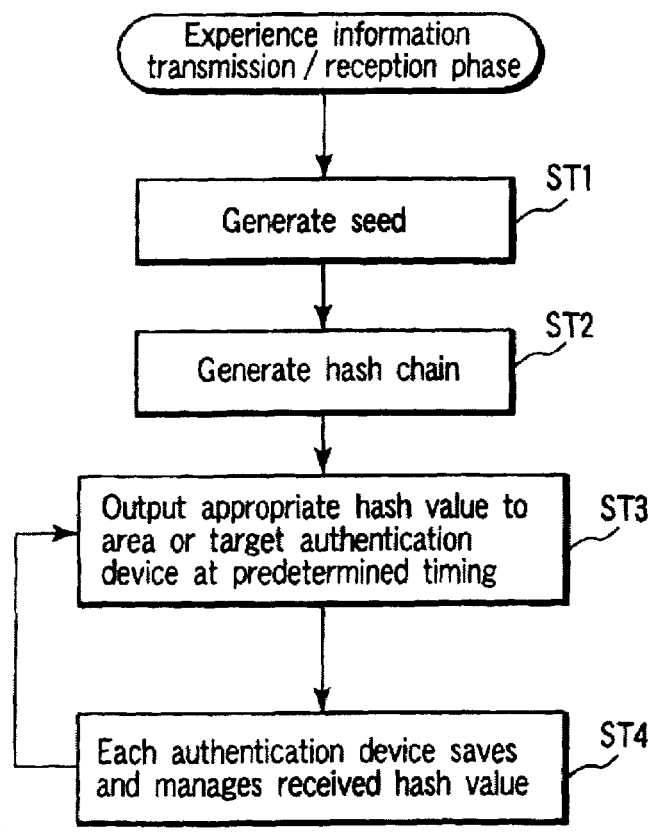
FIG. 3 shows the configuration of a management table in the first embodiment.
FIG. 5 is a flow chart for explaining the operation in the first embodiment.

Note that the management table T is managed by the hash value manager 12, and holds sets of experience ranks, experience information (seed information S or hash values), and device identification information (device IDs), as shown in FIG. 3.

Experience ranks $1, 2, \ldots, k-1, k$ are stepped values used to give differences in authorities and the like among the respective authentication devices $20_1$ to $20_n$, and also indicate the recursive calculation counts of a hash function used to derive a series of hash values $z_1, \ldots, z_k$ from seed information S. Experience ranks $1, 2, \ldots, k-1, k$ indicate higher ranks with decreasing numerical value.

Note that the experience rank can be defined by the total attending time to the area, the operation process count in the area, or the like of the corresponding authentication device $20_j$, and need only have contents indicating some order. For example, the experience rank is normally updated along a time series (the total attending time, operation process count, or the like). However, the experience rank may be set to a high value upon initial setups depending on the importance of the authentication device. In this case, the experience rank assumes a value depending on a rank such as importance other than experiences (time series). That is, an adjunct "experience" is irrelevant to its normal meaning in some cases, and may be omitted if required, or may be replaced by other terms such as "knowledge", "priority", "authority", "attendance", "permission", or "hierarchy", as needed.

Seed information S is an initial value of a hash chain, and can use, e.g., a random number, arbitrary numerical value, command, or the like.

Hash values $z_1$ to $z_k$ are saved in the management table T to form sets with the experience ranks. Note that hash values to be managed are arbitrary ones of all values from seed information S to last hash value $z_k$. The hash values to be managed may be, for example, seed information S and all hash values $z_1$ to $z_k$, may be discrete values such as every 10th hash values $z_{10}$, $z_{20}$, . . . from seed information S, or may be seed information S and last hash value $z_k$ alone.

The seed generator 13 has a function of generating seed information S on the basis of a seed generation request received from the hash value manager 12, and outputting this seed information S to the hash value manager 12.

The hash value generator 14 has a function of calculating, on the basis of a hash value calculation request containing a recursive calculation count, and source data, which are received from the hash value manager 12, a hash value by recursively applying a hash function to the source data in correspondence with the calculation count contained in the request, and outputting the obtained set of hash value and experience rank to the hash value manager 12.

Each of the authentication devices $20_1$ to, $20_2$, . . . , $20_a$, . . . $20_x$, . . . , $20_n$ has an experience rank and hash value, and can authenticate the experience rank of another authentication device $20_j$. More specifically, each of the authentication devices $20_1$ to $20_n$ comprises a communication controller 21, hash value manager 22, hash value calculator 23, and experience examination manager 24. Since the authentication devices $20_1$ to $20_n$ have the same arrangement, a case will be exemplified below wherein an authentication device $20_x$ is defined as the device, and an authentication device $20_a$ is defined as another device.

The communication controller $21_x$ has the following functions (21/1) to (21/5).

(21/1) A function of receiving a set of experience rank and hash value from the experience information management device 10.

(21/2) A function of transmitting a hash value transmission request or re-transmission request to the experience information management device 10.

(21/3) A function of requesting the hash value manager $22_x$ to send an experience rank and hash value on the basis of a certification request received from the other device $20_a$, and transmitting the experience rank and hash value received from this hash value manager $22_x$ to the certification request source.

(21/4) A function of requesting the hash value manager $22_x$ to verify the authenticity of a set of experience rank and hash value, which are received from the authentication device $20_a$ to which the device $20_x$ transmitted a certification request.

(21/5) A function of outputting the verification result by the hash value manager $22_x$ to the corresponding authentication device $20_a$.

The hash value manager $22_x$ has the following functions (22/1) to (22/10).

(22/1) A function of saving and managing a set of experience rank and hash value received from the communication controller $21_x$.

(22/2) A function of checking if the device meets experience rank i, certification of which is requested from the other authentication device $20_a$.

(22/3) A function of notifying, if the device does not meet experience rank i, the communication controller $21_x$ of those contents.

(22/4) A function of outputting, if the device meets experience rank i, hash value $z_i$ to the communication controller $21_x$.

(22/5) A function of requesting, if the device meets experience rank i but manages hash value $z_{i-t}$ higher than experience rank i, the hash value calculator $23_x$ to calculate corresponding hash value $z_i$ by lowering the experience rank.

(22/6) A function of outputting hash value $z_i$ received from the hash value calculator $23_x$ to the communication controller $21_x$.

(22/7) A function of receiving a verification request of hash value $z_i$ from the communication controller $21_x$.

(22/8) A function of verifying hash value $z_i$ requested to verify on the basis of the hash value managed by the device.

(22/9) A function of outputting the verification result to the communication controller $21_x$.

(22/10) A function of outputting experience rank i, hash value $z_i$, and device ID of the verified authentication device $20_a$ to the experience examination manager 24.

The hash value calculator $23_x$ has a function of calculating a hash value suitable for certification or verification in accordance with a request from the hash value manager $22_x$, and a function of outputting the calculated hash value to the hash value manager $22_x$.

The experience examination manager $24_x$ has a function of saving and managing a set of experience rank i, hash value $z_i$, and device ID of the verified authentication device $20_a$ from the hash value manager $22_x$. That is, the experience examination manager $24_x$ has a function of saving and managing the experience ranks and hash values for respective device IDs of the authentication devices $20_1$ to $20_n$ which belong to the area of interest. Note that function limitation information may be registered for respective experience ranks, and the functions of the authentication devices $20_1$ to $20_n$ may be limited for respective experience ranks.

The operation of the authentication system with the above arrangement will be described below in the order of transmission/reception of experience information and authentication of experience information using the diagram of FIG. 4 and the flow charts of FIGS. 5 and 6.

(Transmission/Reception of Experience Information)

Figure 4:
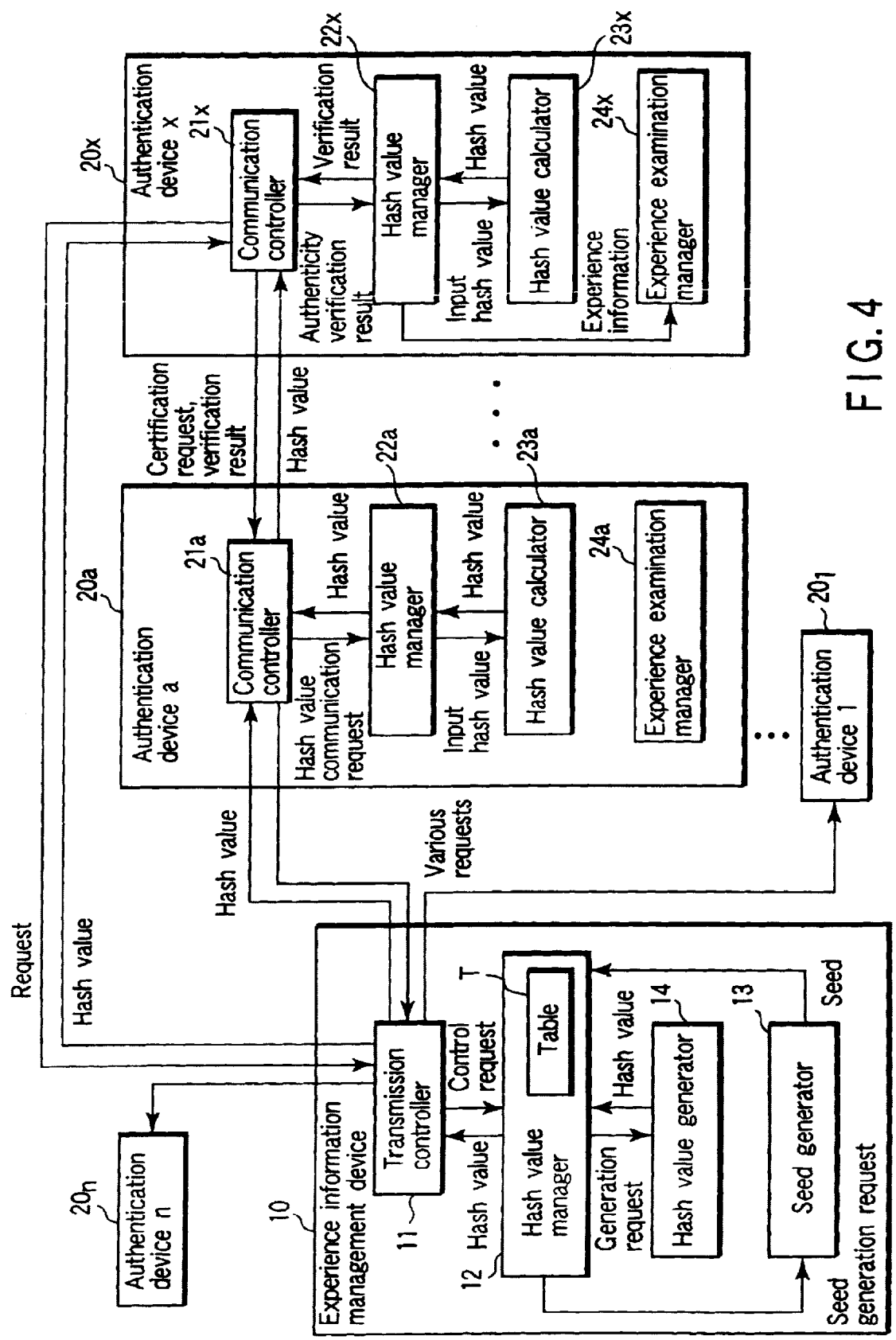
FIG. 4 is a block diagram for explaining the operation in the first embodiment.

In the experience information management device 10, the hash value manager 12 sends a seed generation request to the seed generator 13, as shown in FIGS. 4 and 5.

The seed generator 13 generates seed information S in accordance with this seed generation request (ST1), and outputs the obtained seed information S to the hash value manager 12.

The hash value manager 12 saves this seed information S, and outputs this seed information S and calculation count k to the hash value generator 14.

The hash value generator 14 recursively calculates a hash chain k times by:

$$z_i = h(S),$$
$$z_2 = h(z_1),$$
$$\ldots,$$
$$z_k = h(z_{k-1}) \tag{1}$$

on the basis of the received seed information S and calculation count k (ST2), and outputs a series of obtained hash values $z_1, z_2, \ldots, z_k$ to the hash value manager 12.

Note that a recursive calculation means that the current output is used as the next input. In the hash chain, it is difficult in term of the calculation volume to calculate source hash value $z_i$ from given hash value $z_{i+1}$ (i+1≦k: i is a natural number) due to the nature of a one-way hash function.

The hash value manager 12 saves and manages a series of hash values $z_1, z_2, \ldots, z_k$ in the management table T for respective device IDs in association with experience ranks.

The hash value manager 12 transmits a set of hash value and experience rank higher than an experience rank held for each device ID to the authentication devices 20₁ to 20ₙ at a predetermined timing via the transmission controller 11 (ST3). Note that the experience information management device 10 may include not only a case wherein hash value z is actively output to the area of interest but also a case wherein a hash value is output on the basis of a hash value transmission request or re-transmission request received from each of the authentication devices 20₁ to 20ₙ.

In each of the authentication devices 20₁ to 20ₙ, the set of hash value and experience rank actively or passively obtained from the experience information management device 10 are received by the communication controller 21, and are managed and saved by the hash value manager 22 (ST4).

The experience information management device 10 repeats steps ST3 and ST4. With this process, the experience information management device 10 delivers a set of hash value $z_{i-1}$ with experience rank i–1 to each of the authentication devices 20₁ to 20ₙ which belong to the area of interest, at a predetermined timing. Note that the hash value $z_{i-1}$ is higher than hash value $z_i$ of the current experience rank i of each authentication device.

(Authentication of Experience Information)

A case will be exemplified below wherein, for example, an authentication device 20ₓ of the authentication devices 20₁ to 20ₙ authenticates the experience rank of an authentication device 20ₐ.

Figure 6:
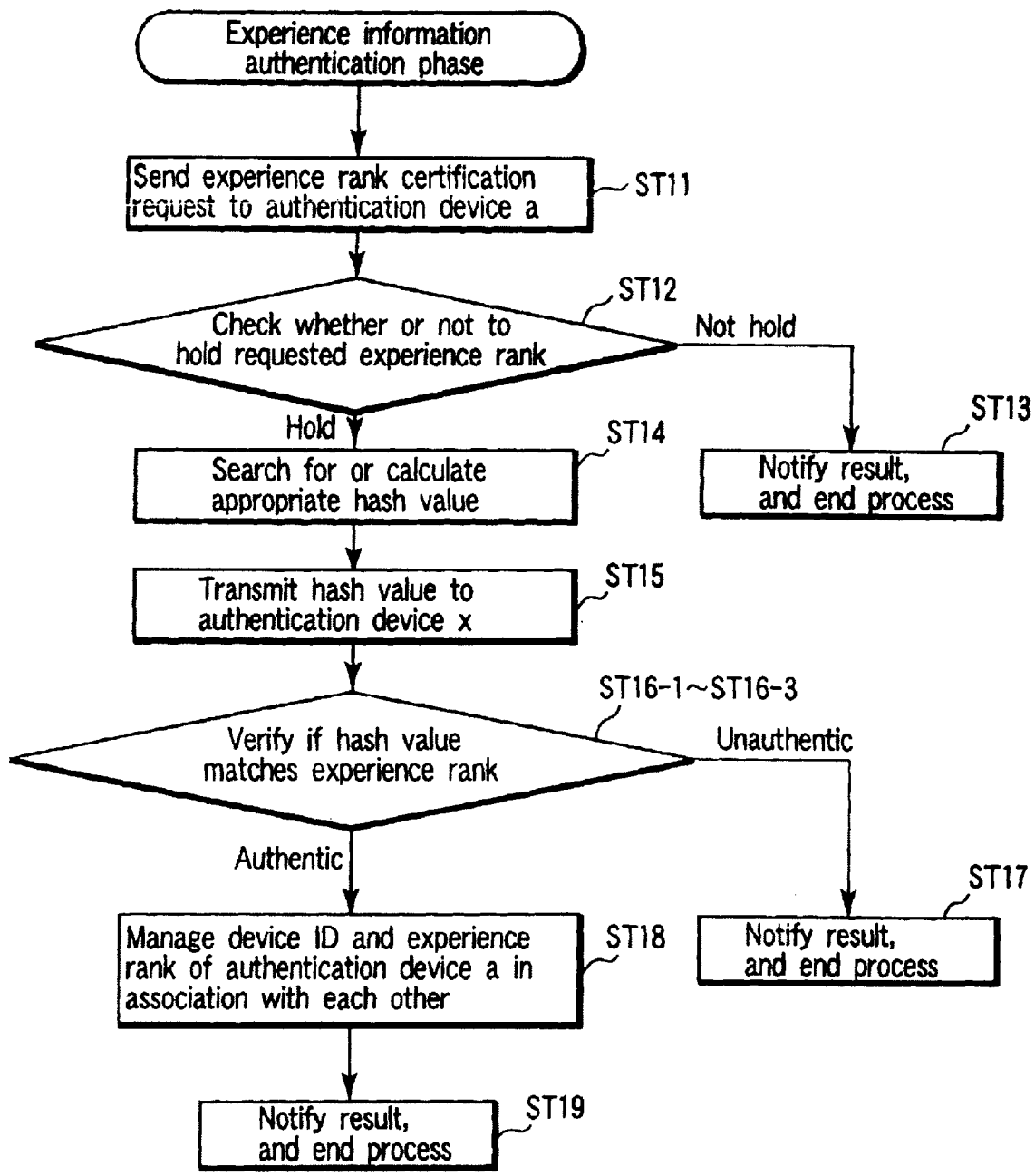
FIG. 6 is a flow chart for explaining the operation in the first embodiment.

In the authentication device 20ₓ within an objective area, the communication controller 21ₓ transmits a certification request used to make the partner authentication device 20ₐ show if it holds experience rank i to the authentication device 20ₐ (ST11), as shown in FIGS. 4 and 6.

In the authentication device 20ₐ, the communication controller 21ₐ requests the hash value manager 22ₐ to transmit hash value $z_i$ of experience rank i on the basis of this certification request.

Upon reception of this request, the hash value manager 22ₐ checks if the device 20ₐ meets experience rank i (ST12). If the device does not meet experience rank i as a result of step ST12, the communication controller 21ₐ notifies the authentication device 20ₓ of it, thus ending the process (ST13). However, a case will be explained below wherein the device meets experience rank i. In this case, the hash value manager 22ₐ searches for hash value $z_i$ of the same experience rank i as in the request (ST14), and outputs the obtained hash value $z_i$ to the communication controller 21ₐ.

On the other hand, if hash value $z_i$ of the same experience rank i is not found as a result of step ST14, the hash value manager 22a outputs hash value $z_{i-t}$ corresponding to the lowest one (i–t) of the managed experience ranks higher than the request to the hash value calculator 23ₐ. The hash value calculator 23ₐ calculates hash value $z_i$ by:

$$z_i = h^{(t)}(z_{i-t}) \quad (2)$$

where $h^{(t)}$ means that the hash function t times recursively calculates input data, and returns the obtained hash value $z_i$ to the hash value manager 22ₐ.

The hash value manager 22ₐ outputs hash value $z_i$ received from the hash value calculator 23ₐ to the communication controller 21ₐ.

In either case, the communication controller 21ₐ of the partner device 20ₐ outputs the obtained hash value $z_i$ and experience rank i to the authentication device 20ₓ (ST15).

In the authentication device 20ₓ in the area, the communication controller 21ₓ receives hash value $z_i$ and experience rank i, and outputs a verification request of the experience rank i and hash value $z_i$ to the hash value manager 22ₓ.

Upon reception of the verification request, the hash value manager 22ₓ searches for hash value $z_i$ of the same experience rank i as in the verification request. If hash value $z_i$ of experience rank i is found, the hash value manager 22ₓ checks if searched/preserved hash value $z_i$ matches the hash value in the verification request (ST16-1). If the two values do not match as a result of step ST16-1, the hash value manager 22ₓ notifies the authentication device 20ₐ that the hash value is unauthentic via the communication controller 21ₓ, thus ending the process (ST17). However, a case will be explained below wherein the two values match. In this case, the hash value manager 22ₓ notifies the communication controller 21ₓ of a verification result "authentic" which indicates that the authentication device 20ₐ holds experience rank i.

On the other hand, if no hash value $z_i$ with the same experience rank i as in the verification request is found, but hash value $z_{i-t}$ higher than the verification request is found, the hash value manager 22ₓ executes the process in step ST16-1 using hash value $z_i$ obtained using equation (2) above in place of the searched/preserved hash value (ST16-2).

Also, if no hash value $z_i$ with the same experience rank i is found, and only hash values $z_{i+t}, z_{i+t+1}, \ldots$ lower than the verification request are available, the hash value manager 22ₓ can neither find nor generate the corresponding hash value $z_i$. In this case, the hash value manager 22ₓ verifies by lowering the experience rank of hash value $z_i$ which is requested to verify in a way opposite to equation (2) above.

That is, the hash value manager 22ₓ selects hash value $z_{i+t}$ that indicates the highest experience rank i+t of lower experience ranks held by the device 20ₓ, and calculates difference information t from the requested experience rank i. After that, the hash value manager 22ₓ outputs the requested hash value $z_i$ and difference information t to the hash value calculator 23ₓ.

The hash value calculator 23ₓ calculates hash value $z'_{i+t}$ on the basis of hash value $z_i$ and difference information t by recursively applying a hash function t times to hash value $z_i$ to be verified.

$$z'_{i+t} = h^{(t)}(z_i) \quad (3)$$

Subsequently, the hash value calculator 23ₓ outputs this hash value $z'_{i+t}$ to the hash value manager 22ₓ.

The hash value manager 22ₓ checks if this hash value $z'_{i+t}$ matches searched/preserved hash value $z_{i+t}$ (ST16-3). If the two values do not match as a result of step ST16-3, a verification result "unauthentic" is sent in step ST17, thus ending the process. However, a case will be explained below wherein the checking result indicates that the two values match. In this case, the hash value manager 22ₓ notifies the communication controller 21ₓ of a verification result "authentic" which indicates that the authentication device 20ₐ holds experience rank i.

On the other hand, the hash value manager 22ₓ transmits a set of device ID and experience rank i of the authentication device 20ₐ to the experience examination manager 24ₓ.

The experience examination manager $24_x$ saves and manages the device ID and experience rank i of the authentication device $20_a$ in association with each other (ST18), and sends an update completion message to the communication controller $21_x$ if the contents have been updated.

Upon reception of the update completion message, the communication controller $21_x$ transmits the aforementioned verification result "authentic" to the authentication device $20_a$. The authentication device $20_x$ ends the authentication process for checking if the authentication device $20_a$ has experience rank i (ST19).

When the aforementioned authentication process is executed with a plurality of authentication devices 20 which belong to the area of interest, the authentication devices 20 can be ranked in descending experience rank in that area. Functions or competence of the authentication devices 20 may be limited in accordance with this experience rank.

According to this embodiment described above, in an environment in which the experience information management device 10 delivers a set of experience rank and hash value to the respective authentication devices $20_1$ to $20_n$, the authentication devices $20_1$ to $20_n$ authenticate each other on the basis of the set of experience rank and hash value as in the example wherein the authentication device $20_x$ authenticates the authentication device $20_a$. Hence, step-by-step and empirical authentication can be implemented upon digital authentication among a plurality of devices.

That is, in the area, the authentication devices $20_1$ to $20_n$ periodically share the experience ranks and hash values, and authenticate an objective authentication device $20_a$ on the basis of this experience rank. In this way, a domain (each authentication device in the area) can gradually and empirically authenticate a new authentication device $20_a$ step by step.

When the authentication devices $20_i$ to $20_n$ in the area verify experience rank i of a given authentication device $20_a$ in that area, functions assigned to the authentication device $20_a$ may be limited in accordance with this experience rank i. For example, collaboration with another authentication device or access to various kinds of information may be controlled in accordance with the experience rank. Also, the functions of the authentication device may be locked outside the area to which that authentication device belongs.

Since the experience ranks of the respective authentication device are managed together in the area, it is expected to immediately detect invasion of a suspicious object (low experience rank) to that area.

In this case, in addition to the normal way of use that loosens functional limitations with increasing experience rank, the way of use like a limited time function that strengthens limitations with increasing experience rank may be adopted. Alternatively, both the ways of use may be combined, and limitations may be loosened most when an device has a middle experience rank. An arbitrary authentication device 20 may also serve as the experience information management device 10.

SECOND EMBODIMENT

Figure 7:
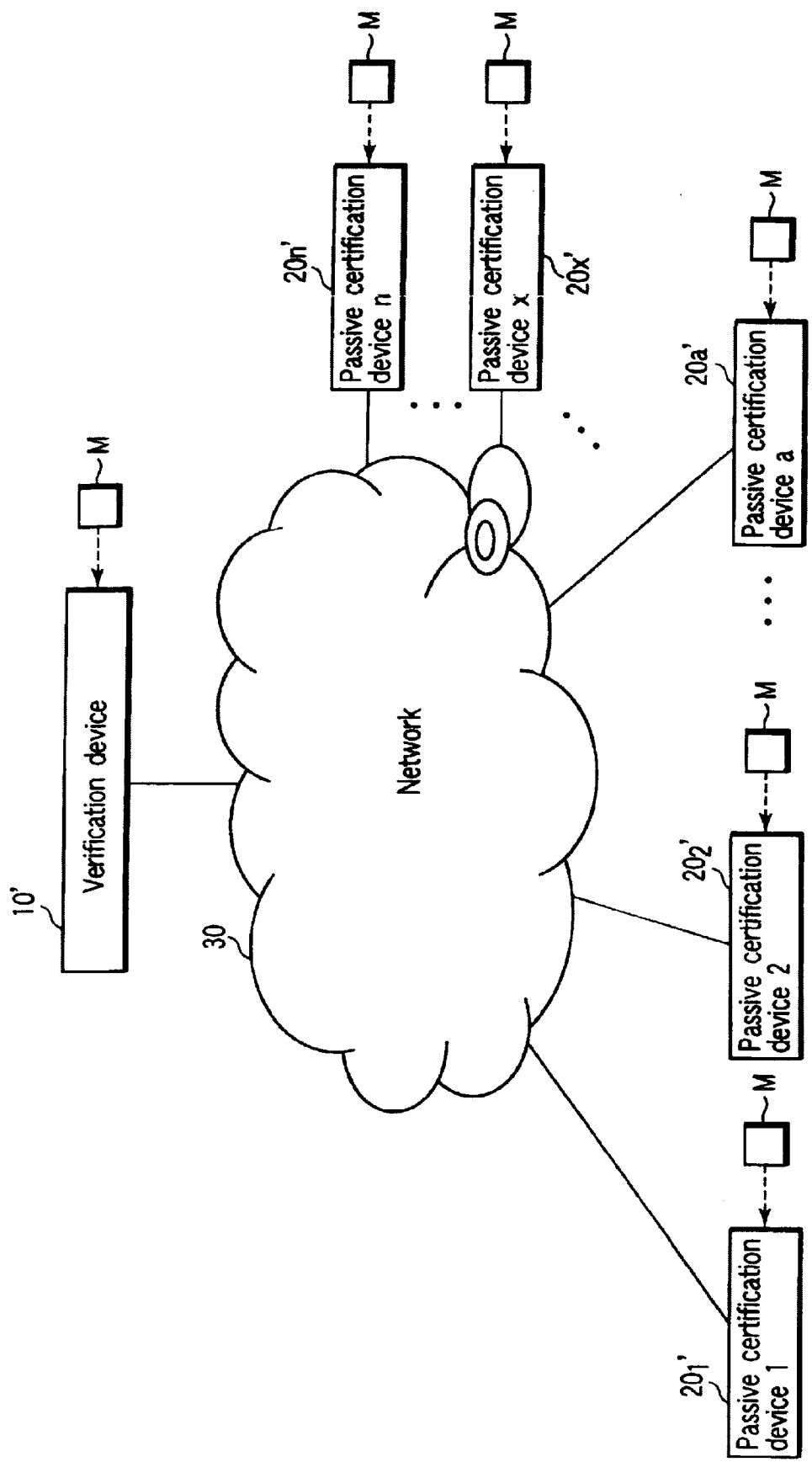
FIG. 7 is a schematic diagram showing the arrangement of an authentication system according to the second embodiment of the present invention.

FIG. 7 is a schematic diagram showing the arrangement of an authentication system according to the second embodiment of the present invention. The same reference numerals or those with symbol ' denote the same or substantially the same building components as in FIG. 1, and a repetitive description thereof will be avoided. Only differences will be explained below.

That is, this embodiment adopts an arrangement in which a verification device 10' authenticates the holding contents of n passive certification devices $20_1'$ to $20_n'$ which hold experience ranks with respect to one verification device 10', unlike in the first embodiment. This arrangement may be called a passive authentication system, since the certification devices $20_1'$ to $20_n'$ are authenticated by one verification device 10'.

Note that the verification device 10' has the functions of both the experience information management device 10 and authentication device $20_x$ mentioned above. More specifically, the verification device 10' comprises a verification transmission controller 11', passive hash value manager 12', seed generator 13, hash value generator 14', and passive experience manager 15, as show in FIG. 8.

The verification transmission controller 11' has the following functions (11'/1) and (11'/2) in addition to the same functions as those of the aforementioned transmission controller 11.

(11'/1) A function of requesting the passive hash value manager 12' to verify the authenticity of a set of experience rank and hash value, which are received from the passive certification device $20a'$ to which the device 10' transmitted a certification request.

(11'/2) A function of outputting the verification result by the passive hash value manager 12' to the certification device $20_a'$ of interest.

The passive hash value manager 12' has the following functions (12'/1) to (12'/4) in addition to the same functions as those of the aforementioned hash value manager 12.

(12'/1) A function of receiving a verification request of hash value $z_i$ from the verification transmission controller 11'.

(12'/2) A function of verifying hash value $z_i$, verification of which is requested on the basis of the hash value managed by the device.

(12'/3) A function of outputting the verification result to the verification transmission controller 11'.

(12'/4) A function of outputting experience rank i, hash value $z_i$, and device ID of the verified certification device $20_a'$ to the passive experience manager 15.

The seed generator 13 and hash value generator 14 have the same functions as those described above.

The passive experience manager 15 has the same functions as those of the experience examination manager $24_x$.

On the other hand, the passive certification device 20' has the functions of the aforementioned authentication device $20_a$, and comprises a certification communication controller $21_a'$, certification hash value manager $22_a'$, and certification hash value calculator $23_a'$.

The certification communication controller $21_a'$ has the following functions (21'/1) to (21'/3) as in the above embodiment.

(21'/1) A function of receiving a set of experience rank and hash value from the verification device 10'.

(21'/2) A function of transmitting a hash value transmission request or re-transmission request to the verification device 10'.

(21'/3) A function of requesting the certification hash value manager $22_a'$ to output an experience rank and hash value on the basis of the certification request received from the verification device 10', and transmitting the experience rank and hash value received from this certification hash value manager $22_a'$ to the certification request source.

The certification hash value manager $22_a'$ has the following functions (22'/1) to (22'/6).

(22'/1) A function of saving and managing a set of experience rank and hash value received from the certification communication controller $21_a'$.

(22'/2) A function of checking if the self device meets experience rank i, certification of which is requested from the verification device 10'.

(22'/3) A function of notifying, if the device does not meet experience rank i, the certification communication controller $21_a'$ of that contents.

(22'/4) A function of outputting, if the device meets experience rank i, hash value $z_i$ to the communication controller $21_a'$.

(22'/5) A function of requesting, if the device meets experience rank i but manages hash value $z_{i-t}$ higher than experience rank i, the certification hash value calculator $23_a'$ to calculate corresponding hash value $z_i$ by lowering the experience rank.

(22'/6) A function of outputting hash value $z_i$ received from the certification hash value calculator $23_a'$ to the certification communication controller $21_a'$.

The certification hash value calculator $23_a'$ has the same functions as those of the aforementioned hash value calculator $23_x$.

The operation of the authentication system with the above arrangement will be described below in the order of transmission/reception of experience information and authentication of experience information using the diagram of FIG. 9 and the flow charts of FIGS. 10 and 11.

(Transmission/reception of Experience Information)

Figure 9:
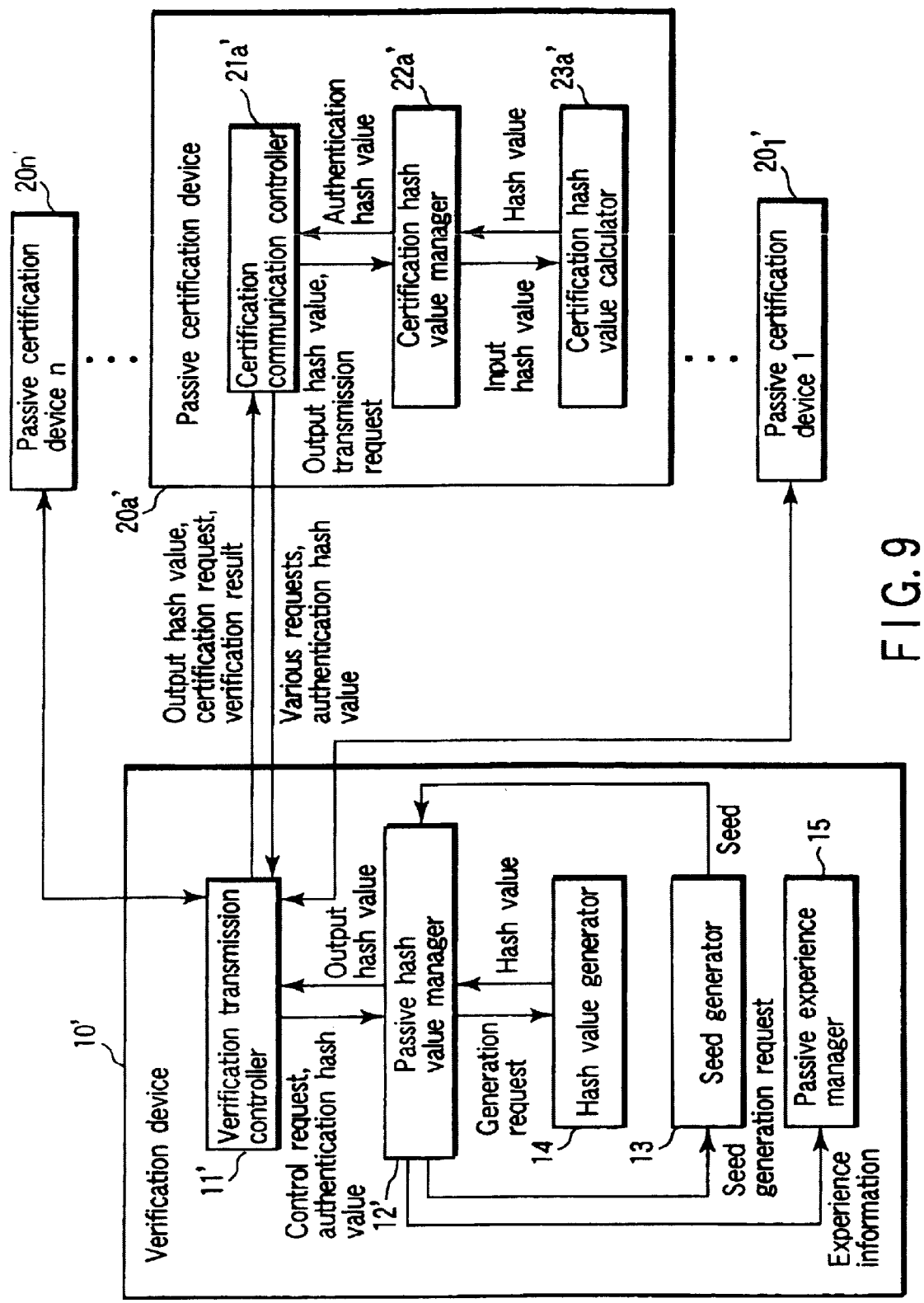
FIG. 9 is a block diagram for explaining the operation in the second embodiment.
Figure 10:
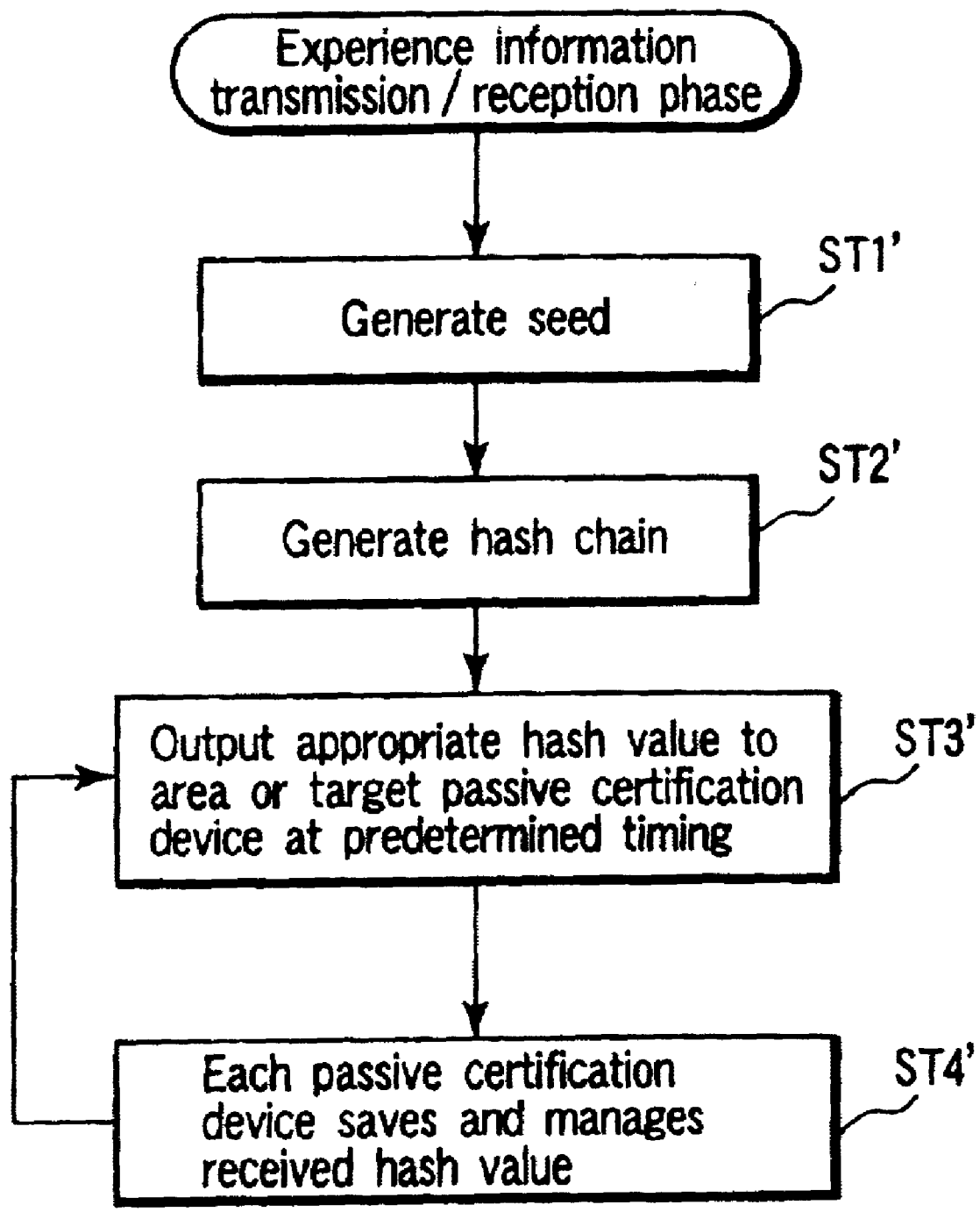
FIG. 10 is a flow chart for explaining the operation in the second embodiment.

In the verification device 10', the passive hash value manager 12' sends a seed generation request to the seed generator 13, as shown in FIGS. 9 and 10, as in the aforementioned experience information management device 10. The seed generator 13 generates seed information S in accordance with this seed generation request (ST1'), and outputs the obtained seed information S to the passive hash value manager 12'.

The passive hash value manager 12' saves seed information S, and outputs this seed information S and calculation count k to the hash value generator 14. The hash value generator 14 recursively calculates a hash chain k times on the basis of the received seed information S and calculation count k (ST2'), as in the above embodiment, and outputs a series of obtained hash values $z_1, z_2, \ldots, z_k$ to the passive hash value manager 12'.

The passive hash value manager 12' saves and manages this series of hash values $z_1, z_2, \ldots, z_k$ in a management table T (not shown) for respective device IDs in association with experience ranks.

The passive hash value manager 12' transmits a set of hash value and experience rank higher than an experience rank held for each device ID to passive certification devices $20_1'$ to $20_n'$ at a predetermined timing via the verification transmission controller 11' (ST3'). Note that the verification device 10' may include not only a case wherein hash value z is actively output to the area of interest but also a case wherein a hash value is output on the basis of a hash value transmission request or re-transmission request received from each of the certification devices $20_1'$ to $20_n'$.

In each of the passive certification devices $20_1'$ to $20_n'$, the set of hash value and experience rank actively or passively obtained from the verification device 10' are received by the communication controller 21', and are managed and saved by the certification hash value manager 22' (ST4').

The verification device 10' repeats steps ST3' and ST4'. With this process, the verification device 10' delivers a set of hash value $z_{i-1}$ with experience rank i–1 higher than hash value $z_i$ of the current experience rank i of each passive certification device, and that experience rank to each of the passive certification devices $20_1'$ to $20_n'$ which belong to the area of interest, at a predetermined timing.

(Authentication of Experience Information)

A case will be exemplified below wherein, for example, the verification device 10' authenticates the its own experience rank held in the passive certification device $20_a'$.

Figure 11:
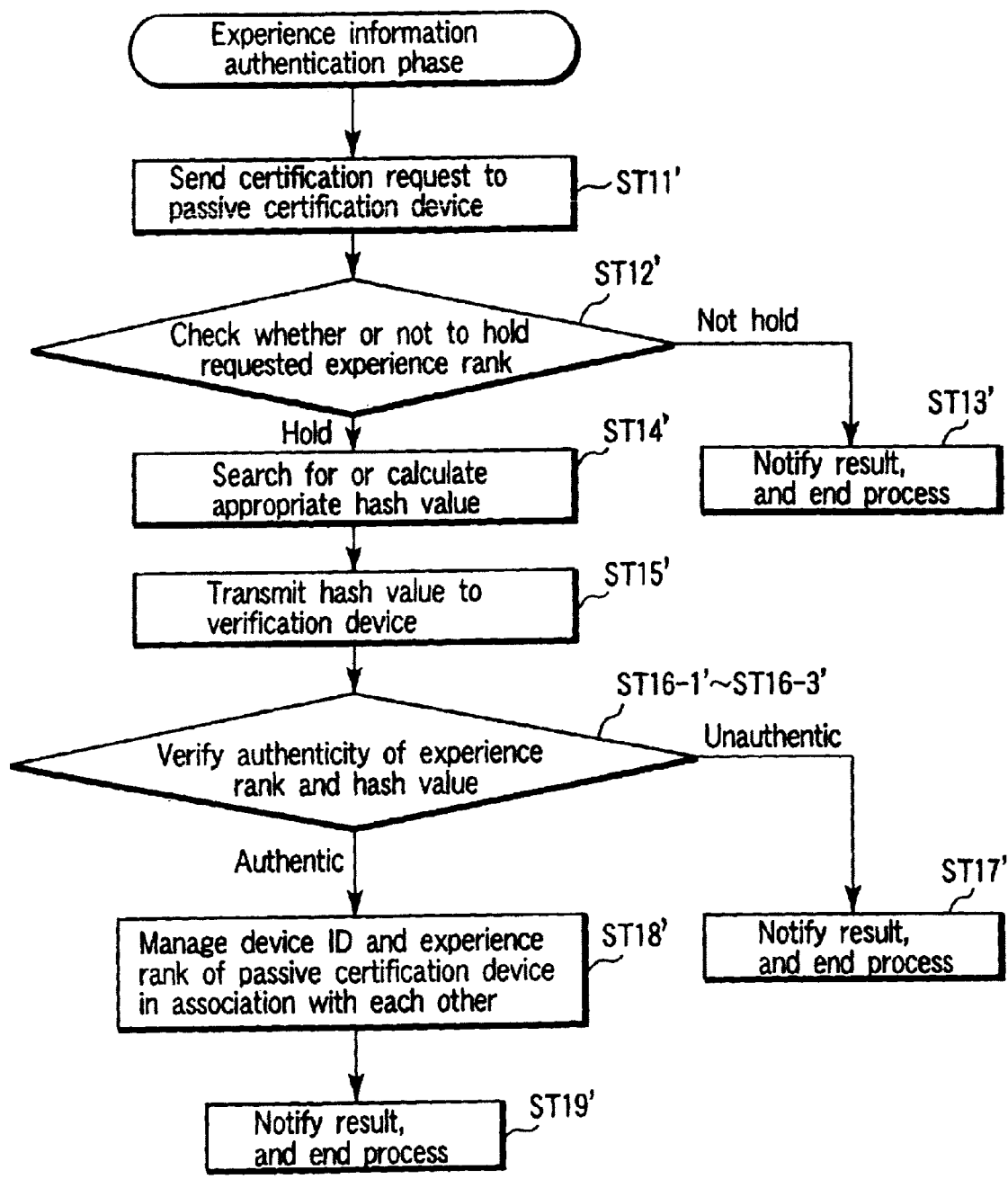
FIG. 11 is a flow chart for explaining the operation in the second embodiment.

In the verification device 10', the verification communication controller 11' transmits a certification request used to make the partner passive certification device $20_a'$ show experience rank i held by that passive certification device $20_a'$ to the passive certification device $20_a'$ (ST11'), as shown in FIGS. 9 and 11.

In the passive certification device $20_a'$, the certification communication controller $21_a'$ requests the certification hash value manager $22_a'$ to transmit hash value $z_i$ of experience rank i on the basis of this certification request.

Upon reception of this request, the certification hash value manager $22_a'$ checks if the device $20_a'$ meets experience rank i (ST12'). If the self device does not meet experience rank i as a result of step ST12', the certification communication controller $21_a'$ notifies the verification device 10' of it, thus ending the process (ST13'). However, a case will be explained below wherein the device meets experience rank i. In this case, the certification hash value manager $22_a'$ searches for hash value $z_i$ of the same experience rank i as in the request (ST14'), and outputs the obtained hash value $z_i$ to the certification communication controller $21_a'$.

On the other hand, if hash value $z_i$ of the same experience rank i is not found as a result of step ST14', the certification hash value manager $22_a'$ outputs hash value $z_{i-t}$ corresponding to the lowest one (i–t) of the managed experience ranks higher than the request to the certification hash value calculator $23_a'$.

After that, the certification hash value manager $22_a'$ outputs hash value $z_i$ calculated in the same manner as in the above embodiment to the certification communication controller $21_a'$.

In either case, the certification communication controller $21_a'$ of the partner device $20a'$ outputs the obtained hash value $z_i$ and experience rank i to the verification device 10' (ST15').

In the verification device 10', the verification communication controller 11' receives hash value $z_i$ and experience rank i, and outputs a verification request of these experience rank i and hash value $z_i$ to the passive hash value manager 12'.

Upon reception of the verification request, the passive hash value manager 12' searches for hash value $z_i$ of the same experience rank i as in the verification request. If hash value $z_i$ of experience rank i is found, the passive hash value manager 12' checks if searched/preserved hash value $z_i$ matches the hash value in the verification request (ST16-1'). If the checking result indicates that the two values do not match, the passive hash value manager 12' notifies the passive certification device $20_a'$ that the hash value is unauthentic via the verification communication controller 11', thus ending the process (ST17'). However, a case will be explained below wherein the two values match. In this case, the passive hash value manager 12' notifies the communication controller $21_x$ of a verification result "authentic" which indicates that the passive certification device $20_a'$ holds experience rank i.

On the other hand, if no hash value $z_i$ with the same experience rank i as in the verification request is found, but hash value $z_{i-t}$ higher than the verification request is found, the passive hash value manager 12' executes the process in step ST16-1' using hash value $z_i$ obtained using equation (2) above in place of the searched/preserved hash value (ST16-2').

Also, if no hash value $z_i$ with the same experience rank i is found, and only hash values $z_{i+t}$, $z_{i+t+1}$, . . . lower than the verification request are available, the passive hash value manager 12' may generate hash value $z_i$ from seed information S under the control of the hash value generator 14. In this case, as an example, the passive hash value manager 12' verifies by lowering the experience rank of hash value $z_i$ which is requested to verify in a way opposite to equation (2) above.

That is, the passive hash value manager 12' selects hash value $z_{i+t}$ that indicates the highest experience rank i+t of lower experience ranks held by the self device 10', and calculates difference information t from the requested experience rank i. After that, the passive hash value manager 12' outputs the requested hash value $z_i$ and difference information t to the hash value generator 14.

The hash value generator 14 calculates hash value $z'_{i+t}$ on the basis of hash value $z_i$ and difference information t, and outputs this hash value $z'_{i+t}$ to the passive hash value manager 12'.

The passive hash value manager 12' checks if this hash value $z'_{i+t}$ matches searched/preserved hash value $z_{i+t}$ (ST16-3'). If the checking result indicates that the two values do not match, a verification result "unauthentic" is sent in step ST17', thus ending the process. However, a case will be explained below wherein the checking result indicates that the two values match. In this case, the passive hash value manager 12' notifies the verification communication controller 11' of a verification result "authentic" which indicates that the passive certification device $20_a'$ holds experience rank i.

On the other hand, the passive hash value manager 12' transmits a set of device ID and experience rank i of the passive certification device $20_a'$ to the passive experience manager 15.

The passive experience manager 15 saves and manages the device ID and experience rank i of the passive certification device $20_a'$ in association with each other (ST18'), and sends an update completion message to the verification communication controller 11' if the contents have been updated.

Upon reception of the update completion message, the verification communication controller 11' transmits the aforementioned verification result "authentic" to the passive certification device $20_a$. The verification device 10' ends the authentication process for checking if the passive certification device $20_a'$ has experience rank i (ST19').

When the aforementioned authentication process is done with a plurality of certification devices 20' which belong to the area of interest, the verification device 10' can verify the experience rank level of the area relative to that of the self device 10'. Depending on this level, the verification device 10' can control its functions in the area.

Note that the verification device 10' need not always notify the passive certification device 20' of the verification result.

As described above, according to this embodiment, the verification device 10' delivers the experience rank and hash value to the passive certification devices $20_1'$ to $20_n'$, and makes these device hold them. Also, the verification device 10' makes the certification devices $20_1'$ to $20_n'$ show their held contents. In this way, step-by-step and empirical authentication of respective devices can be implemented upon digital authentication among a plurality of devices.

That is, the verification device 10' authenticates its own area where it can invoke functions by verifying how much the area of interest knows secret information (experience rank and hash value) of the verification device 10'. Note that the secret information is gradually exposed to respective passive certification devices in the area. In this manner, the verification device 10' can empirically and gradually authenticate the domain as its authentic domain step by step.

Note that the passive certification devices $20_1'$ to $20_n'$ may show a partial experience rank with respect to a hash value generated by the verification device 10' in place of the highest experience rank. Note that the partial experience rank is a flush value calculated from the one which indicates the highest held experience rank.

Also, all the passive certification devices 20' which belong to the area need not always manage the experience information of the verification device 10', but some of those passive certification devices 20' may manage the experience information of the verification device 10'.

The verification device 10' may authenticate the highest experience rank held by the passive certification devices 20' in the area as an experience rank of that area. The verification device 10' may consider the average of experience ranks held by the passive certification devices 20' as an experience rank of the area. The definition of the experience rank of the area is not particularly limited as long as it is defined based on the experience ranks held by the passive certification devices $20_1'$ to $20_n'$. The verification device 10' can control its own functions in accordance with the experience rank of the area.

Furthermore, appropriate ones of the aforementioned functions of the verification device 10' may be separated and shared by another substitute device. For example, the function of calculating a hash chain from seed information S and distributing the calculated hash values (hash value generator 14) of the verification device 10' may be separated and shared by another substitute device. In this case, the function of generating seed information S (seed generator 13) may also be separated. Alternatively, the function of verifying the passive certification devices $20_1'$ to $20_n'$ in the area (some functions of the passive hash value manager 12' and experience examination manager 15) of the verification device 10' may be separated and shared by another substitute device. In these cases, the substitute device may be implemented as a server device of a third party.

THIRD EMBODIMENT

An authentication system according to the third embodiment of the present invention will be described below. This embodiment corresponds to a modification of the first or second embodiment, and executes authentication without transmitting hash value $z_i$, thereby improving the secrecy of the hash value.

More specifically, as a preparation, assume that p and q are sufficiently large prime numbers which satisfy p=nq+1 (n is an integer), g is a generator of a subgroup of order q, and respective devices can use these p, q, and g as system parameters. Also, assume that a commitment which has hash value $z_i$ of experience rank i as a discrete logarithm is defined as $g^{z_i} \bmod p$.

Note that commitments $g^{z_i}$ may be managed together as a database which an arbitrary verifier can refer to. Also, commitments $g^{z_i}$ may be held by a prover or verifier as values digitally signed by a hash value generator, reliable device, or the like, together with time-series information such as current time information.

Under the condition of such preparation, this embodiment transmits as verification information a pair value set (r, s) to be described later in place of hash value $z_i$ itself in step ST15 or ST15' in the first or second embodiment. Note that the pair value set (r, s) is calculated using a pair value set ($z_i$, $g^{z_i}$) of hash value $z_i$ and commitment $g^{z_i}$.

More specifically, as described in 1) to 4) below, a prevalent challenge & response protocol need only be executed using hash value $z_i$ as a secret key and $g^{z_i}$ mod p as a public key. Note that 1) to 4) correspond to steps ST15 to ST16-3 (or ST15' to ST16-3') mentioned above.

1) The authentication device 20$_a$ (or passive certification device 20$_a$') as a prover notifies the authentication device 20$_x$ (or verification device 10') as a verifier that it holds hash value $z_i$ of experience rank i.

2) The authentication device 20$_x$ generates challenge c∈$z_q$* so as to verify if the authentication device 20$_a$ holds discrete logarithm $z_i$ of commitment $g^{z_i}$ mod p corresponding to experience rank i, and transmits it to the authentication device 20$_a$.

3) Upon reception of challenge c, the authentication device 20$_a$ generates random number k, calculates r=($g^k$ mod p) mod q and s=$k^{-1}$\{c+$z_i$·r\}mod q, and transmits a pair value set (r, s) to the authentication device 20$_x$.

4) Upon reception of the pair value set (r, s), the authentication device 20$_x$ calculates $u_1$=$s^{-1}$c and $u_2$=$rs^{-1}$ and verifies if ($g^{u_1}y^{u_2}$ mod p)mod q=r. If this verification formula holds, the authentication device 20$_x$ confirms that the authentication device 20$_a$ holds hash value $z_i$ of experience rank i.

After that, the authentication device 20$_x$ (or verification device 10') executes steps ST18 and ST19 (or ST18' and ST19') as in the above embodiment, thus ending the process.

As described above, according to this embodiment, upon authenticating hash value $z_i$, its presence is certified without transmitting hash value $z_i$. Because of this, in addition to the effects of the first or second embodiment, experience rank i can be verified without exposing experience information that the verifier does not know, thus improving the secrecy of the experience information.

That is, when this embodiment is applied to the first embodiment, even when the prover (authentication device 20$_a$) has a higher experience rank than the verifier (authentication device 20$_x$), experience information that the verifier does not know need not be exposed.

When this embodiment is applied to the second embodiment, even when an illicit device passes itself as the verification device 10', the passive certification device 20$_a$' need not expose the experience information associated with the verification device 10' to an illicit device other than the device 10'.

When this embodiment is applied to the second embodiment, the verification device 10' need not always publish commitment $g^{z_i}$ mod p. Since the verification device 10' is an device for generating a hash value as well as a verification device, it can internally generate a commitment. If the commitment is not published, a feature that allows only an device which holds hash value $z_i$ of that experience rank i to verify the authenticity of hash value $z_i$, i.e., limits a verifier, is added.

Even when this embodiment is applied to the first embodiment, the management device need not publish a commitment in some cases. Assume that an authentication device having the fifth experience rank and that having the seventh experience rank are present. When the 10th experience rank is authenticated between these two authentication devices, since these authentication devices can internally generate commitments, the need for publishing a commitment can be obviated. In this way, when the two authentication devices authenticate the 10th experience rank lower than their fifth and seventh experience ranks, a commitment need not be published. By contrast, assume that an authentication device having the seventh experience rank authenticates the fifth experience rank with respect to an authentication device having the third experience rank. In this case, since the authentication device having the seventh experience rank cannot internally generate a commitment, publication or an inquiry to the management device is required.

In the first to third embodiments, experience rank i may be defined using any of the attending time to an area for each device, the execution count of a given process, an event count such as enrollment of a new device and the like as a unit, or in combination of these units. Note that the units which express the experience rank are not limited to those described above, and any other kind of information may be used as long as it can express experiences as ranks and does not depart from the scope of the present invention.

Furthermore, a means which practically forms the experience rank is not limited to a hash chain, and a means using any other kind of information may be adopted as long as it can express experience ranks and does not depart from the scope of the present invention. As such information, current event information such as event information in the area of interest at a given timing, the total number of authentication devices, and the like may be used.

Also, the challenge & response protocol is not limited to DSA (digital signature algorithm) signature, but may be modified to any other method as long as it can notify a verifier that hash value $z_i$ is held without presenting hash value $z_i$.

Note that the method described in each of the above embodiments can be delivered while being stored, as a program that can be executed by a computer, in a storage media such as a magnetic disk (floppy disk, hard disk, or the like), optical disk (CD-ROM, DVD, or the like), magnetooptical disk (MO), semiconductor memory, or the like.

The format of the storage medium is not particularly limited as long as it can store a program and is readable by a computer.

An OS (operating system), MW (middleware) such as database management software, network software, or the like, which runs on a computer, may execute some of the processes required to implement this embodiment on the basis of instructions of the program which is installed from a storage medium.

Furthermore, the storage medium of the present invention is not limited to a medium independent from a computer, and includes a storage medium which stores or temporarily stores a program downloaded via a LAN, the Internet, or the like.

The number of storage media is not limited to one, and the storage medium of the present invention includes a case wherein the processes of this embodiment are executed from a plurality of media. Hence, the medium configuration is not particularly limited.

Note that a computer in the present invention executes respective processes in this embodiment on the basis of a program stored in a storage medium, and may adopt either arrangement, i.e., a standalone device such as a personal computer, or a system formed by connecting a plurality of devices via a network.

The computer in the present invention is not limited to a personal computer, but includes an arithmetic processing device, microcomputer, or the like included in an information processing device, and collectively means devices and devices that can implement the functions of the present invention based on a program.

Note that the present invention is not limited to the aforementioned embodiments, and various modifications may be made without departing from the scope of the invention when it is practiced. The respective embodiments may be combined as needed as long as possible, and combined effects can be obtained in such case. Furthermore, the embodiments include inventions of various stages, and various inventions can be extracted by appropriately combining a plurality of required constituent elements disclosed in this application. For example, when an invention is extracted by omitting some of all constituent elements described in the embodiments, the omitted elements are compensated for by state-of-the-art techniques as needed upon practicing the extracted invention.

In addition, various modifications may be made without departing from the scope of the present invention.

What is claimed is:

1. A system of authentication in which first and second authentication devices authenticate each other, the first authentication device comprising:

first management means for managing experience information of a low experience rank, which is unidirectionally generated from experience information of a high experience rank, and for, when a set of its own experience rank and experience information higher than the managed set of experience rank and experience information is delivered in accordance with an experience, managing the delivered set of experience rank and experience information;

first certification means for, when a certification request of the its own experience rank is received from the second authentication device, transmitting corresponding experience information in the first management means to the second authentication device; and first verification means for, when a certification request of an experience rank is sent to the second authentication device, verifying experience information obtained from the second authentication device on the basis of the experience information in the first management means, and the second authentication device comprising:

second management means for managing experience information of a low experience rank, which is unidirectionally generated from experience information of a high experience rank, and for, when a set of its own experience rank and experience information higher than the managed set of experience rank and experience information is delivered in accordance with an experience, managing the delivered set of experience rank and experience information;

second certification means for, when a certification request of the its own experience rank is received from the first authentication device, transmitting corresponding experience information in the second management means to the first authentication device; and second verification means for, when a certification request of an experience rank is sent to the first authentication device, verifying experience information obtained from the first authentication device on the basis of the experience information in the second management means.

2. A system of authentication in which first and second authentication devices authenticate each other, the first authentication device comprising:

first management means for managing experience information of a low experience rank, which is unidirectionally generated from experience information of a high experience rank, and for, when a set of its own experience rank and experience information higher than the managed set of experience rank and experience information are delivered in accordance with an experience, managing the delivered set of experience rank and experience information;

first certification means for, when a certification request of the its own experience rank is received from the second authentication device, transmitting verification information associated with corresponding experience information in the first management means to the second authentication device; and first verification means for, when a certification request of an experience rank is sent to the second authentication device, verifying verification information obtained from the second authentication device on the basis of the experience information in the first management means, and the second authentication device comprising:

second management means for managing experience information of a low experience rank, which is unidirectionally generated from experience information of a high experience rank, and for, when a set of its own experience rank and experience information higher than the managed set of experience rank and experience information are delivered in accordance with an experience, managing the delivered set of experience rank and experience information;

second certification means for, when a certification request of the its own experience rank is received from the first authentication device, transmitting verification information associated with corresponding experience information in the second management means to the first authentication device; and second verification means for, when a certification request of an experience rank is sent to the first authentication device, verifying verification information obtained from the first authentication device on the basis of the experience information in the second management means.

3. A management device for managing a plurality of authentication devices, comprising:

generation means for unidirectionally generating experience information of a low experience rank from experience information of a high experience rank;

management means for managing sets of experience information and experience ranks generated by the generation means together with identification information of each authentication device; and delivery means for delivering a set of higher experience rank and experience information to each of the authentication devices with reference to the management means in accordance with an experience of that authentication device.

4. An authentication device which can authenticate another authentication device, comprising:

generation means for unidirectionally generating experience information of a low experience rank from experience information of a high experience rank;

management means for, when a set of its own experience rank and experience information higher than a managed set of experience rank and experience information is delivered in accordance with an experience, managing the delivered set of experience rank and experience information;

certification means for, when a certification request of the its own experience rank is received from the other authentication device, transmitting corresponding experience information in the management means to the authentication device as a request source; and verification means for, when a certification request of an experience rank is sent to the other authentication device, verifying experience information obtained from the other authentication device on the basis of the experience information in the management means using the generation means.

5. An authentication device according to claim 4, wherein the verification means verifies by confirming if a set of experience rank and experience information of the other authentication device match a set of experience rank and experience information of the self device when the two experience ranks are equal to each other.

6. An authentication device which can authenticate another authentication device, comprising:

generation means for unidirectionally generating experience information of a low experience rank from experience information of a high experience rank;

management means for, when a set of its own experience rank and experience information higher than a managed set of experience rank and experience information are delivered in accordance with an experience, managing the delivered set of experience rank and experience information;

certification means for, when a certification request of the its own experience rank is received from the other authentication device, transmitting verification information associated with corresponding experience information in the management means to the authentication device as a request source; and verification means for, when a certification request of an experience rank is sent to the other authentication device, verifying verification information obtained from the other authentication device on the basis of the experience information in the management means using the generation means.

7. A verification device comprising:

generation means for unidirectionally generating experience information of a low experience rank from experience information of a high experience rank;

management means for managing sets of experience information and experience ranks generated by the generation means together with identification information of each certification device;

delivery means for delivering a set of higher experience rank and experience information to each certification device with reference to the management means in accordance with an experience of that certification device; and verification means for, when a certification request of an experience rank is sent to a given certification device, verifying experience information obtained from that certification device with reference to the management means.

8. A verification device according to claim 7, wherein the verification means verifies by confirming if a set of experience rank and experience information of another certification device matches a set of experience rank and experience information of the self device when the two experience ranks are equal to each other.

9. A verification device comprising:

generation means for unidirectionally generating experience information of a low experience rank from experience information of a high experience rank;

management means for managing sets of experience information and experience ranks generated by the generation means together with identification information of each certification device;

delivery means for delivering a set of higher experience rank and experience information to each certification device with reference to the management means in accordance with an experience of that certification device; and verification means for, when a certification request of an experience rank is sent to a given certification device, verifying "verification information associated with experience information" obtained from that certification device with reference to the management means.

10. A certification device comprising:

management means for managing a set of experience rank and experience information of a verification device, which is delivered from the verification device; and certification means for, when a certification request of an experience rank is received from the verification device, transmitting the experience information in the management means to the verification device.

11. A certification device comprising:

management means for managing a set of experience rank and experience information of a verification device, which are delivered from the verification device; and certification means for, when a certification request of an experience rank is received from the verification device, transmitting verification information associated with the experience information in the management means to the verification device.

12. A computer program stored in a computer readable storage medium which is used in a management device for managing a plurality of authentication devices, comprising:

a first program code of making a computer execute a generation process of unidirectionally generating experience information of a low experience rank from experience information of a high experience rank;

a second program code of making the computer execute a management process of managing sets of experience information and experience ranks generated by the generation process together with identification information of each authentication device; and a third program code of making the computer execute a delivery process of delivering a set of higher experience rank and experience information to each of the authentication devices with reference to the management process in accordance with an experience of that authentication device.

13. A computer program stored in a computer readable storage medium which is used in an authentication device which can authenticate another authentication device, comprising:

a first program code of making a computer execute a generation process of unidirectionally generating experience information of a low experience rank from experience information of a high experience rank;

a second program code of making the computer execute a management process of managing, when a set of its own experience rank and experience information higher than a managed set of experience rank and experience information is delivered in accordance with an experience, the delivered set of experience rank and experience information;

a third program code of making the computer execute a certification process of transmitting, when a certification request of the its own experience rank is received from the other authentication device, corresponding experience information in a result of the management process to the authentication device as a request source; and a fourth program code of making the computer execute a verification process of verifying, when a certification request of an experience rank is sent to the other authentication device, experience information obtained from the other authentication device on the basis of the experience information in a result of the management process using the generation process.

14. A program according to claim 13, wherein the verification process verifies by confirming if a set of experience rank and experience information of the other authentication device matches a set of experience rank and experience information of the self device when the two experience ranks are equal to each other.

15. A computer program stored in a computer readable storage medium which is used in an authentication device which can authenticate another authentication device, comprising:

a first program code of making a computer execute a generation process of unidirectionally generating experience information of a low experience rank from experience information of a high experience rank;

a second program code of making the computer execute a management process of managing, when a set of its own experience rank and experience information higher than a managed set of experience rank and experience information is delivered in accordance with an experience, the delivered set of experience rank and experience information;

a third program code of making the computer execute a certification process of transmitting, when a certification request of the its own experience rank is received from the other authentication device, verification information associated with corresponding experience information in a result of the management process to the authentication device as a request source; and a fourth program code of making the computer execute a verification process of verifying, when a certification request of an experience rank is sent to the other authentication device, verification information obtained from the other authentication device on the basis of the experience information in a result of the management process using the generation process.

16. A computer program stored in a computer readable storage medium which is used in a verification device, comprising:

a first program code of making a computer execute a generation process of unidirectionally generating experience information of a low experience rank from experience information of a high experience rank;

a second program code of making the computer execute a management process of managing sets of experience information and experience ranks generated by the generation process together with identification information of each certification device;

a third program code of making the computer execute a delivery process of delivering a set of higher experience rank and experience information to each certification device with execution of the management process in accordance with an experience of that certification device; and a fourth program code of making the computer execute a verification process of verifying, when a certification request of an experience rank is sent to a given certification device, experience information obtained from that certification device with reference to a result of the management process using the generation process.

17. A program according to claim 16, wherein the verification process verifies by confirming if a set of experience rank and experience information of another certification device matches a set of experience rank and experience information of the self device when the two experience ranks are equal to each other.

18. A computer program stored in a computer readable storage medium which is used in a verification device, comprising:

a first program code of making a computer execute a generation process of unidirectionally generating experience information of a low experience rank from experience information of a high experience rank;

a second program code of making the computer execute a management process of managing sets of experience information and experience ranks generated by the generation process together with identification information of each certification device;

a third program code of making the computer execute a delivery process of delivering a set of higher experience rank and experience information to each certification device with execution of the management process in accordance with an experience of that certification device; and a fourth program code of making the computer execute a verification process of verifying, when a certification request of an experience rank is sent to a given certification device, "verification information associated with experience information" obtained from that certification device with reference to a result of the management process using the generation process.

19. An authentication method with which a plurality of authentication devices authenticate each other, comprising:

managing, when each authentication device receives a delivery of a set of its own experience rank and experience information higher than a managed set of experience rank and experience information in accordance with an experience, the delivered set of experience rank and experience information;

transmitting, when each authentication device receives a certification request of the its own experience rank from the other authentication device, the managed experience information to the authentication device as a request source;

verifying, when each authentication device sends a certification request of an experience rank to the other authentication device, experience information obtained from the authentication device on the basis of the managed experience information; and confirming, upon verification, if two pieces of experience information corresponding to an identical experience rank match, by unidirectionally generating experience information of a low experience rank from experience information of a high experience rank of a set of experience rank and experience information of the authentication device and a set of experience rank and experience information of the self device.

20. An authentication method with which a plurality of authentication devices authenticate each other, comprising:
managing, when each authentication device receives a delivery of a set of its own experience rank and experience information higher than a managed set of experience rank and experience information in accordance with an experience, the delivered set of experience rank and experience information;
transmitting, when each authentication device receives a certification request of the its own experience rank from the other authentication device, verification information associated with the managed experience information to the authentication device as a request source;
verifying, when each authentication device sends a certification request of an experience rank to the other authentication device, verification information obtained from the authentication device on the basis of the managed experience information; and
confirming, upon verification, if two pieces of verification information corresponding to an identical experience rank match, by unidirectionally generating verification information of a low experience rank from verification information of a high experience rank of a set of experience rank and verification information of the authentication device and a set of experience rank and verification information of the self device.

21. A management method in which a management device manages a plurality of authentication devices, comprising:
unidirectionally generating experience information of a low experience rank from experience information of a high experience rank;
managing generated sets of experience information and experience ranks together with identification information of each authentication device; and
delivering a set of higher experience rank and experience information to each of the authentication devices with reference to the managed contents in accordance with an experience of that authentication device.

22. An authentication method with which an authentication device authenticates another authentication device, comprising:
managing, when a set of its own experience rank and experience information higher than a managed set of experience rank and experience information are delivered in accordance with an experience, the delivered set of experience rank and experience information;
transmitting, when a certification request of the its own experience rank is received from the other authentication device, the managed experience information to the authentication device as a request source;
verifying, when a certification request of an experience rank is sent to the other authentication device, experience information obtained from the authentication device on the basis of the managed experience information; and
confirming, upon verification, if two pieces of experience information corresponding to an identical experience rank match, by unidirectionally generating experience information of a low experience rank from experience information of a high experience rank of a set of experience rank and experience information of the authentication device and a set of experience rank and experience information of the self device.

23. An authentication method with which an authentication device authenticates another authentication device, comprising:
managing, when a set of its own experience rank and experience information higher than a managed set of experience rank and experience information is delivered in accordance with an experience, the delivered set of experience rank and experience information;
transmitting, when a certification request of the its own experience rank is received from the other authentication device, the managed experience information to the authentication device as a request source;
verifying, when a certification request of an experience rank is sent to the other authentication device, verification information associated with experience information obtained from the authentication device on the basis of the managed experience information; and
confirming, upon verification, if two pieces of verification information corresponding to an identical experience rank match, by unidirectionally generating verification information of a low experience rank from verification information of a high experience rank of a set of experience rank and verification information of the authentication device and a set of experience rank and verification information of the self device.

24. A verification method comprising:
unidirectionally generating experience information of a low experience rank from experience information of a high experience rank;
managing generated sets of experience information and experience ranks together with identification information of each certification device;
delivering a set of higher experience rank and experience information to each certification device with reference to the managed contents in accordance with an experience of that certification device; and
verifying, when a certification request of an experience rank is sent to a given certification device, experience information obtained from that certification device with reference to the managed contents.

25. A verification method comprising:
unidirectionally generating experience information of a low experience rank from experience information of a high experience rank;
managing generated sets of experience information and experience ranks together with identification information of each certification device;
delivering a set of higher experience rank and experience information to each certification device with reference to the managed contents in accordance with an experience of that certification device; and
verifying, when a certification request of an experience rank is sent to a given certification device, "verification information associated with experience information" obtained from that certification device with reference to the managed contents.

* * * * *